UNITED STATES PATENT OFFICE 2,684,369

CERTAIN THIENYL, CYCLOALKENYL ACETAMIDES

Frederick Leonard, Jackson Heights, N. Y., assignor to Warner-Hudnut, Inc., New York, N. Y., a corporation of Delaware No Drawing. Application July 21, 1951, Serial No. 238,031

4 Claims. (Cl. 260—293.4)

This invention relates to new compounds of pharmaceutical value, particularly as antispasmodics.

In accordance with my invention there are produced compounds having the following generic structural formula:

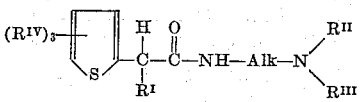

wherein $R^I$ denotes a cyclohexenyl or cyclopentenyl radical; $R^{II}$ and $R^{III}$, which may be the same or different, denote alkyl radicals containing not over 4 carbon atoms, or together denote a polymethylene radical containing not over 5 carbon atoms, and which may be interrupted by an oxygen, sulfur or imino group; $R^{IV}$ denotes hydrogen, a short chain alkyl radical or halogen, which members may be the same or different; and Alk denotes an alkylene radical containing not over 6 carbon atoms and which may be straight chain or branched. These compounds have been found to possess effective antispasmodic activity.

The compounds of my invention may be readily prepared by reacting an alpha-substituted 2-thienylacetyl halide of the following structural formula:

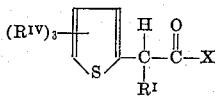

wherein $R^I$ and $R^{IV}$ are as above defined and X denotes halogen, with a diamine of the following structural formula:

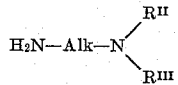

wherein $R^{II}$, $R^{III}$ and Alk are as above defined. This reaction may be conveniently carried out in a suitable solvent such as benzene, under reflux. The thienylacetyl chlorides from which the compounds of my invention are prepared may be readily obtained by treatment of the corresponding alpha-substituted thienylacetic acids with excess thionyl chloride in a suitable solvent such as benzene, under reflux.

The free basic esters of my invention are water-insoluble liquids. Water-soluble salts may be formed by treating the free bases with acids such as hydrochloric acid, hydrobromic acid, sulfuric acid, tartaric acid, citric acid or succinic acid, or with suitable organic halides, e. g., alkyl halides such as methyl chloride or methyl bromide, aralkyl halides such as benzyl chloride or benzyl bromide or other organic halides such as thienylmethyl chloride.

The following example is illustrative of my invention:

Example

To a solution of 627 gms. (3.02 moles) of alpha-($\Delta^2$-cyclopentenyl)-2-thienylacetic acid in 1510 cc. of dry benzene, 395 gms. (3.32 moles) of thionyl chloride were added slowly, the mixture heated to boiling and refluxed for one hour. The solvent and excess thionyl chloride were removed under vacuum and the residue distilled at 3 mm. The fraction boiling at 114–140° C. was collected and refractionated at 2.7 mm., whereby 317 gms. of pure alpha-($\Delta^2$-cyclopentenyl)-2-thienylacetyl chloride, B. P. 121–125°, $n_D^{20}$ 1.555 was obtained. Analysis gave the following results: Calculated for $C_{11}H_{11}ClOS$: C=58.29, H=4.89, Cl=15.65. Found: C=58.45, H=4.70, Cl=15.60.

A solution of 11.4 gms. (0.05 mole) of alpha-($\Delta^2$-cyclopentenyl)-2-thienylacetyl chloride prepared as above described in 100 cc. of dry benzene was added slowly to 5.8 gms. (0.05 mole) of N,N-diethylethylenediamine dissolved in 50 cc. of dry benzene; the reaction mixture was refluxed for 4 hours, let cool overnight, and extracted with 40 cc. and 25 cc. portions of water. The combined aqueous solution was then shaken with a solution of 8 gms. of sodium hydroxide in 12 cc. of water with cooling, the liberated amine was separated and the aqueous solution extracted twice with 30 cc. portions of ether. The combined ether extracts and amine layer were dried over anhydrous potassium carbonate. The ether was distilled off and the residue fractionated in vacuo, 11.24 gms. of a product boiling between 150–156° C. at 0.001 mm., $n_D^{20}$ 1.5381, being recovered.

The hydrochloride of the above base was then prepared by adding 7.4 cc. of 4.92 N ethanolic HCl to a solution of the base in 100 cc. of ethyl acetate. Addition of 115 cc. of ether and chilling caused 11.40 grams of a salt to crystallize, melting point 122.5–123.5° C. This material was then recrystallized by dissolution in 110 cc. of a 5% solution of ethanol in ethyl acetate, followed by addition of Skellysolve B to the point of turbidity and cooling, to give 10.53 grams pure N-(2-diethylaminoethyl)-alpha-($\Delta^2$-cyclopentenyl)-2-thienylacetamide hydrochloride of melting point 123–124° C. Analysis gave the following results: Calculated for $C_{17}H_{27}ClN_2OS$: C=59.55, H=7.94, Cl=10.34. Found: C=59.86, H=7.64, Cl=10.32.

By substituting an equivalent amount of alpha- ($\Delta^2$-cyclohexenyl)-2-thienylacetic acid for the corresponding cyclopentenyl derivative in the above example, the compound N - (2 - diethylamino - ethyl) - alpha - ($\Delta^2$ - cyclohexenyl) - 2 - thienylacetamide was obtained. Other compounds within the scope of the present invention may be obtained by substituting suitable reactants in the procedure described in the above example. Such compounds include: 2 - (N - piperidino) - ethyl - alpha - ($\Delta^2$ - cyclopentenyl) - 2 - thienylacetamide, 2 - diethylaminoethyl - alpha - ($\Delta^2$ - cyclopentenyl) - 3 - methyl - 2 - thienylacetamide, 2 - diethylaminoethyl - alpha - ($\Delta^2$ - cyclohexenyl) - 4 - chloro - 2 - thienylacetamide, 2 - dimethylaminoethyl - alpha - ($\Delta^2$ - cyclopentenyl) - 2 - thienylacetamide, 2 - di - isopropylaminoethyl - alpha - ($\Delta^2$ - cyclohexenyl) - 2 - thienylacetamide, $\gamma$-diethylamino propyl - alpha - ($\Delta^2$ - cyclopentenyl) - 2 - thienylacetamide, 2 - (N - morpholino) - ethyl - alpha - ($\Delta^2$ - cyclopentenyl) - 2 -thienylacetamide, 2 - (N - thiomorpholino) - ethyl - alpha - ($\Delta^2$ - cyclopentenyl) - 2 - thienylacetamide, 2 - (N - thiomorpholino) - ethyl - alpha - ($\Delta^2$ - cyclohexenyl) - 2 - thienylacetamide, 2 - (N - piperazino) - ethyl - alpha - ($\Delta^2$ - cyclopentenyl) - 2 - thienylacetamide, as well as water soluble salts of these basic esters.

Since certain changes may be made in the compounds above described without departing from the scope of my invention it is intended that all matter contained in the above description shall be interpreted as illustrative and not in a limiting sense.

I claim:

1. A compound selected from the group consisting of compounds having the formula

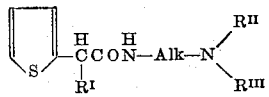

wherein $R^I$ is a member selected from the group consisting of cyclohexenyl and cyclopentenyl radicals; $R^{II}$ and $R^{III}$ are members selected from the group consisting of alkyl radicals containing from 1–3 carbon atoms and together with the nitrogen form cyclic members selected from the group consisting of piperidino, morpholino, thiomorpholino and piperazino radicals; and Alk denotes an alkylene chain containing from 2–3 carbon atoms; and salts thereof.

2. The compound 2 - diethylaminoethyl - alpha - ($\Delta^2$ - cyclopentenyl) - 2 - thienylacetamide hydrochloride.

3. The compound 2 - diethylaminoethyl - alpha - ($\Delta^2$ - cyclohexenyl) - 2 - thienylacetamide hydrochloride.

4. The compound 2 - (N - piperidino) - ethyl - alpha - ($\Delta^2$ - cyclohexenyl) - 2 - thienylacetamide hydrochloride.

References Cited in the file of this patent

UNITED STATES PATENTS

| Number | Name | Date |
|---|---|---|
| 2,437,545 | Martin et al. | Mar. 9, 1948 |
| 2,538,795 | Moffett et al. | Jan. 23, 1951 |
| 2,541,634 | Blicke | Feb. 13, 1951 |
| 2,561,385 | Leonard | July 24, 1951 |
| 2,573,015 | Hafliger et al. | Oct. 30, 1951 |

FOREIGN PATENTS

| Number | Country | Date |
|---|---|---|
| 625,811 | Great Britain | July 5, 1949 |